(12) United States Patent
Lentz et al.

(10) Patent No.: US 8,650,502 B2
(45) Date of Patent: Feb. 11, 2014

(54) METHOD FOR PRECISE NAVIGATION OF DATA

(75) Inventors: James L. Lentz, Austin, TX (US); David R. Schwartz, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/303,532

(22) Filed: Nov. 23, 2011

(65) Prior Publication Data

US 2013/0132892 A1    May 23, 2013

(51) Int. Cl.
  *G06F 3/048*    (2013.01)
(52) U.S. Cl.
  USPC ......................................................... 715/786
(58) Field of Classification Search
  USPC ......................................................... 715/786
  See application file for complete search history.

(56) References Cited

U.S. PATENT DOCUMENTS

| | | | |
|---|---|---|---|
| 6,448,985 B1 | 9/2002 | McNally | |
| 6,816,174 B2 * | 11/2004 | Tiongson et al. | 715/787 |
| 7,542,845 B2 | 6/2009 | Sands et al. | |
| 2007/0143706 A1 * | 6/2007 | Peters | 715/786 |
| 2007/0192744 A1 * | 8/2007 | Reponen | 715/833 |
| 2010/0056221 A1 | 3/2010 | Park | |
| 2010/0058226 A1 * | 3/2010 | Flake et al. | 715/786 |
| 2012/0023438 A1 * | 1/2012 | Xia et al. | 715/783 |

* cited by examiner

*Primary Examiner* — Stephen Hong
*Assistant Examiner* — Terri Filosi
(74) *Attorney, Agent, or Firm* — Jeffrey T. Holman (57) ABSTRACT

Disclosed is a scrolling system with adjustable granularity. The system includes a user interface that displays data on a display device. The scrolling system further includes a system for scrolling through data. The system detects a scroll command in a first direction from a user interface. A display area is configured to shift in the first direction when a user issues the scroll command. The system also detects a granularity setting command in a second direction. A scroll bar is configured to shift in the second direction when the user issues the granularity setting command. The system is configured to adjust a granularity setting corresponding to a position of the scroll bar on the display when the scroll bar crosses a threshold point. The granularity setting corresponds to various levels of response sensitivity to the scroll command. Other embodiments of the system and methods are also described.

20 Claims, 7 Drawing Sheets

METHOD FOR PRECISE NAVIGATION OF DATA

BACKGROUND

While using software, users frequently encounter lists, tables, or large amounts of displayed data. These lists, tables, and other data structures are often very expansive, lengthy, or difficult to navigate. Navigation through these lists, tables, and other data has become increasingly difficult and time-consuming as they have grown in length.

Unfortunately, applications and methods for users to easily browse data records within these data structures have not kept pace with the increase in length. Many software applications require scrolling through data one record at a time, paging up and down, various flicking methods, or dragging a cursor or thumb across a display in an inefficient and imprecise way to find sought after data.

SUMMARY

Embodiments of a system are described. In one embodiment, the system is a scrolling system with adjustable granularity. The system includes a user interface for displaying data on a display device. The scrolling system also includes a system for scrolling through data, the system being configured to perform several operations. One operation is detecting a scroll command from a user interface in a first direction. A display area is configured to shift in the first direction when a user issues the scroll command. Another operation is detecting a granularity setting command from the user interface in a second direction. A scroll bar is configured to shift in the second direction when the user issues the granularity setting command. Another operation is adjusting a granularity setting after the scroll bar crosses a threshold point on the display. The granularity setting corresponds to a level of response sensitivity to the scroll command. Other embodiments of the system and methods are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

One benefit of an embodiment of the scrolling system is increasing control over the resolution of the navigation. The scrolling system allows a user to dynamically change the granularity by which navigation through data will change the display view. This may be done by tactically positioning a cursor or pointing device along an axis on a display and sliding the cursor or pointing device along the axis. The scrolling system allows a user to control the granularity setting of scrolling through data, from a low granularity setting to a high granularity setting, corresponding to higher and lower sensitivity to scroll commands. The scrolling system allows a user to control the resolution and granularity of scrolling through data through varying levels of refinement in a smooth and continuous manner with higher accuracy.

Figure 1:
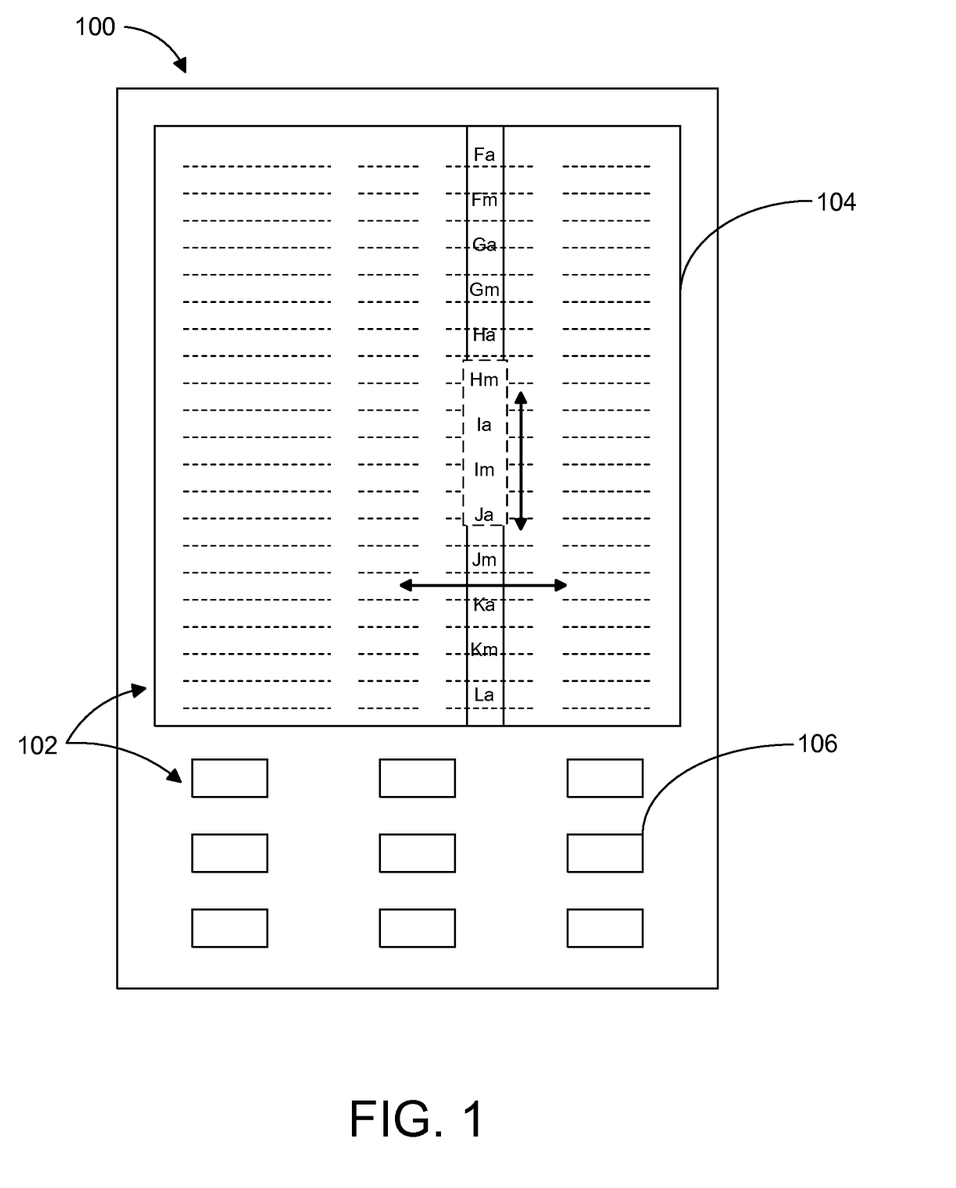
FIG. 1 depicts a schematic diagram of one embodiment of a device that incorporates a scrolling system with adjustable granularity.

FIG. 1 depicts a schematic diagram of one embodiment of a user device 100 that incorporates a scrolling system with adjustable granularity. The user device 100 includes a user interface 102 for inputting data and communicating with the device 100. In the illustrated device 100, the user interface 102 includes a display 104 which may be a touchscreen or other electronic display. The user interface 102 may also include a plurality of inputs 106, such as a keyboard, buttons or other components for inputting data and communicating with the user device 100. While the depicted device 100 resembles an electronic device such as a cell phone, the user device 100 may be one of any electronic device capable of scrolling through data, such as a cell phone, computer, laptop, notebook, media player, or any electronic device with a display 104 and one or more input mechanisms.

The device 100 may incorporate any number of user interfaces 102 for implementing the scrolling system. In one embodiment, the user interface 102 includes only a touchscreen that is controlled by moving a finger or other object across the screen. In another embodiment, the display 104 and user interface 102 may include components on separate devices, such as a keyboard, mouse, or other remote control device. In some embodiments, the user interface 102 and display 104 may share some components, such as a touchscreen, as well as having separate components, such as a mouse, buttons or a keyboard.

The scrolling system incorporated by the user device 100 is a system for a user to input a scroll or granularity setting command and scroll through data on a display. When a user issues a scroll command, generally an input in a direction along a first axis, the electronic device is directed by a processor to scroll through the data or display area in a vertical or horizontal direction. The rate at which the displayed data scrolls corresponds to a granularity setting stored in memory. A user may change the granularity setting by issuing a granularity setting command, generally an input in a direction along a second axis. The granularity setting command shifts a scroll bar across the display until it crosses a threshold point at which the granularity setting changes. A user may then issue another scroll command and the data will shift at a rate that corresponds to the new granularity setting.

Figure 2:
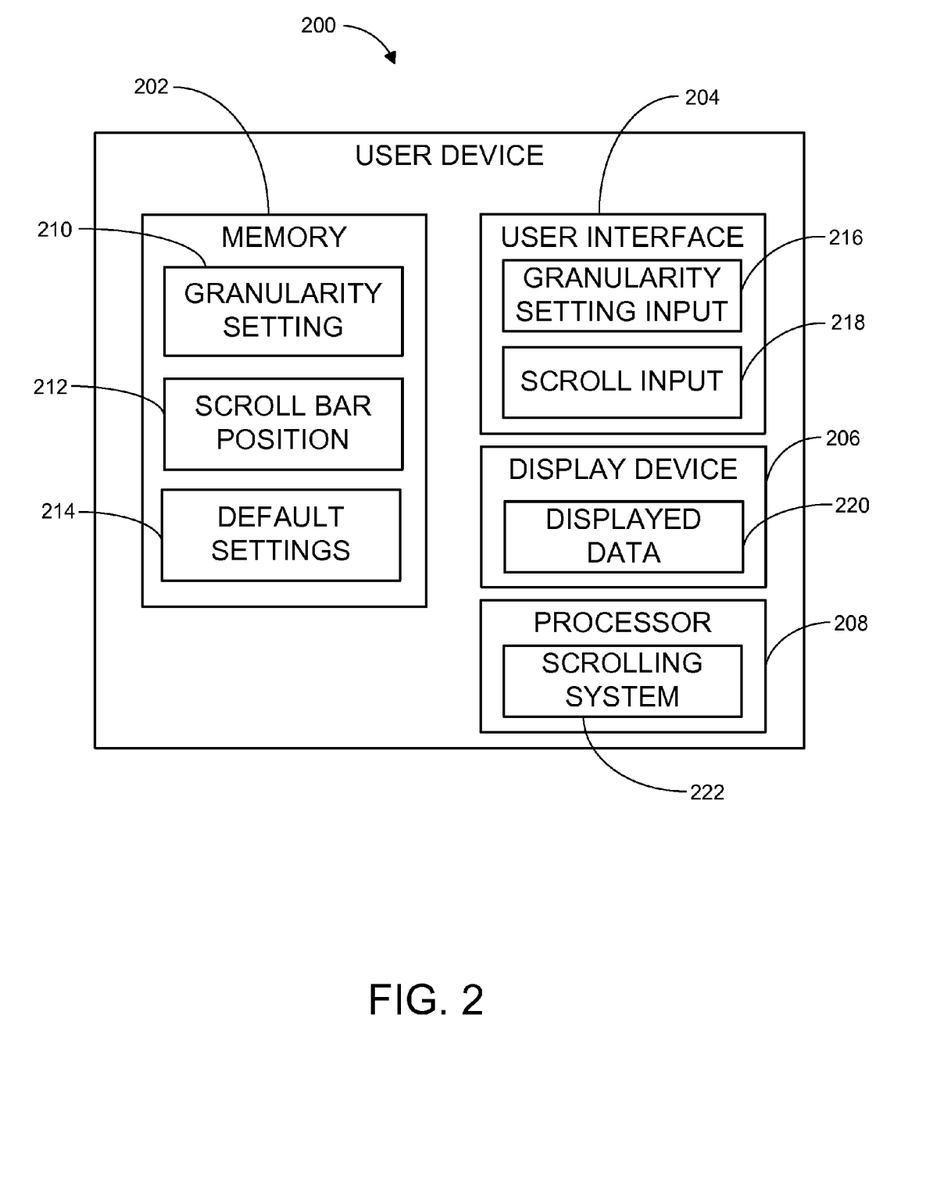
FIG. 2 depicts a block diagram of components of one embodiment of a device that incorporates a scrolling system with adjustable granularity.

FIG. 2 discloses a block diagram of components of one embodiment of a device 200 that incorporates a scrolling system 222 with adjustable granularity. The device 200 includes a memory component 202. In one embodiment, the memory component 202 includes a granularity setting 210 and a scroll bar position 212. The scroll bar position 212 corresponds to the placement of the scroll bar 212 on the display 206 of the device 200. A user may issue a granularity setting input 216 by shifting the scroll bar from one position into another. The scroll bar position 212 on the display generally corresponds to a number of granularity settings 210 whenever the scroll bar shifts across the display 206 and crosses different transition points. The granularity setting 210 and scroll bar position 212 may be dynamically provided via user input or may be retrieved from default settings 214 within the memory 202. The user device 200 further includes a user interface 204. The user interface 204 provides functionality so that a user may send a granularity setting input 216 and a scroll input 218 to a processor 208. The processor 208 processes the granularity setting and scroll inputs 216, 218 and executes commands causing a display device 206 to scroll through a list of data 220 at a rate corresponding to the granularity setting 210 currently in use. The processor 206 also dynamically processes the granularity setting 210 and scroll bar location 212, and may instruct the memory 202 to change and/or store the current settings as well as default settings 214 for further use.

The scroll bar position 212 corresponds to various granularity settings 210 and may be changed by a user issuing a granularity setting input 216. The granularity setting 210 further corresponds to the sensitivity of response of the displayed data 220 to a scroll input 218. For example, at a first granularity setting 210, the displayed data 220 or list of data may be configured to scroll at a 10:1 ratio to a corresponding shift in the scroll input 218 (e.g. the data 220 scrolls 200 pixels in response to a corresponding 20 pixel scroll input). At this setting, the scroll input 218 has a high response sensitivity and the display window or list of data 220 scrolls more rapidly when a scroll input 218 is given. A user may then issue a granularity setting input 216 by sliding the scroll bar into a second scroll bar position 212 corresponding to a second granularity setting 210. At the second granularity setting 210, the display data 220 may be configured to scroll at a 2:1 ratio to a corresponding shift in the scroll input 218, thus having an intermediate response sensitivity to a scroll input 218. A user may then issue another granularity setting input 216 by sliding the scroll bar into a third scroll bar position 212 corresponding to a third granularity setting 210. At the third granularity setting 210, the display data 220 may be configured to shift at a 1:1 ratio to a corresponding shift in the scroll input 218, thus having a low response sensitivity to a scroll input 218. These ratios and settings are by way of example only, and may be higher or lower in other embodiments. In some embodiments, other methods of response sensitivity other than the sensitivity ratios described above may be utilized, depending on the type of data or length of a list of data to be displayed. In at least one example, where a list of data is particularly long, scroll sensitivity may be determined by a percentage measurement, rather than a ratio measurement. In other embodiments, other methods of response sensitivity may be used, depending on unique properties of that data, or based on different types of data to be displayed.

The memory 202 may store and utilize the granularity setting 210, scroll bar position 212, and default settings 214 in a variety of ways. In one embodiment, the granularity setting 210 and scroll bar position 212 are the same as the default settings 214 every time the scrolling system is utilized. Upon receipt of a granularity setting input 216, the granularity setting 210 and scroll bar position 212 may be changed from their original default settings 214. The granularity setting 210 and scroll bar position 212 may be configured to reset to the same default settings 214 every time the scrolling application is closed or the user device 200 is turned off. The default setting 214 may also be configured to reset every time a period of time passes, restoring the granularity setting 210 and scroll bar position 212 to the default settings 214 after a period of inactivity. In one embodiment, the default settings 214 may be stored to correspond to the last known granularity setting 210 and scroll bar position 212, allowing a user to reuse settings that may be more applicable in scrolling through a frequently used set of data. In this scenario, the default settings 214 are stored in memory 202 to correspond to the last known granularity setting 210 and scroll bar position 212, and used for retrieval purposes whenever the scrolling system is used. In one embodiment, a user may manually set the default settings 214 according to a desired preference, allowing the user to always begin with a certain granularity setting 210 and corresponding scroll bar location 212. In some embodiments, the granularity settings 210 may correspond to other criteria of a list of the data to be displayed 220. For example, in some embodiments, the length of the list, type of data, or other criteria may affect the granularity settings 220, including the default granularity settings 210 or multiple granularity settings upon input of granularity setting commands 216.

Figure 3A:
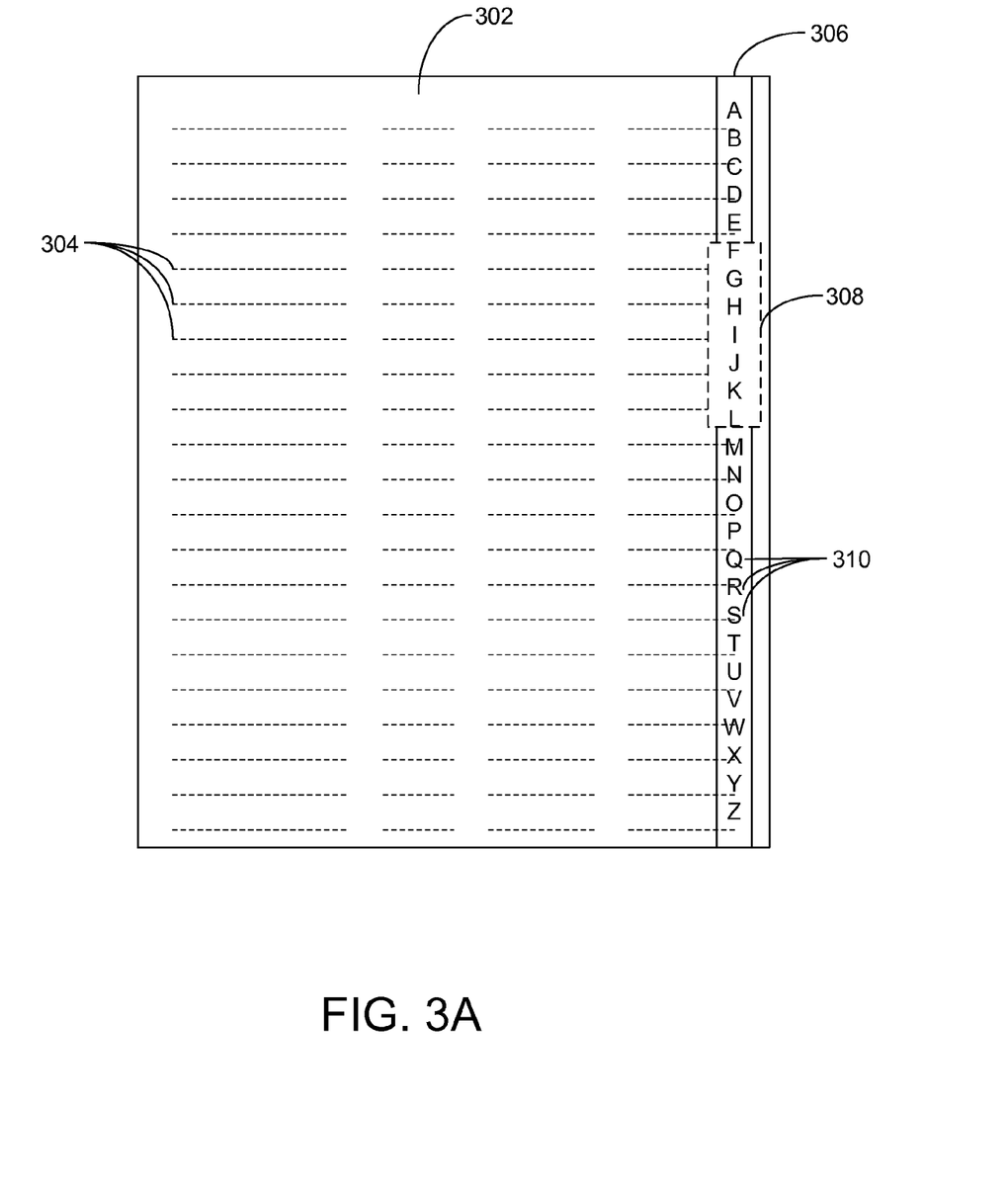
FIG. 3A depicts a display of a device which uses one embodiment of a scrolling system with adjustable granularity with a scroll bar in a first position.

FIG. 3A depicts a display of a device which uses one embodiment of a scrolling system with adjustable granularity with a scroll bar 306 in a first position. The display 302 displays lists, files, indexes, or other data 304. In one embodiment, the display 302 shows a vertically oriented scroll bar 306 on the right side of the display 302. The position of the scroll bar 306 corresponds to a first granularity setting. The scroll bar 306 includes a scroll frame 308 which may correspond to the viewing area displayed on the display 302 and may display the current granularity setting of the program. In one embodiment, the scroll bar 306 includes a scroll field 310 of letters, corresponding to the list of data 304 and order that the data 304 is indexed. The scroll field 310 may be any type of data, such as numbers, letters, color hues, icons, or other data capable of being used for indexing.

In one embodiment, the scroll bar 306 includes a scroll frame 308 that corresponds to the displayed data 304 and the current granularity setting 210. A user may issue a scroll command shifting the scroll frame 308 up or down, also shifting the display area or list of data 304 across the display 302 of the device. The display area may be the same as the entire display 302, where the entire screen shifts up or down corresponding to the scroll frame 308. The display area may also be a display window within a program, capable of shifting a list of data 304 or the viewing window within that particular program, without shifting the entire display 304 of the device up or down. The scroll frame 308 may alternatively be arbitrary in width or height relative to the viewing window of the display 302, not necessarily spanning the length or width of the entire display as shown in the illustrated embodiment. In the illustrated embodiment, the scroll bar 306 is vertically oriented, but may have other orientations, such as horizontal, diagonal, or another angle at which the data 304 is displayed. In a horizontal orientation, the scroll command would be in a horizontal direction rather than vertical, and the display area would shift according to the indexing data. While the display area may shift horizontally with a horizontal scroll bar 306, it need not necessarily correspond to the same directional orientation as the scroll bar 306, and may shift in any direction when a scroll command is given.

Figure 3B:
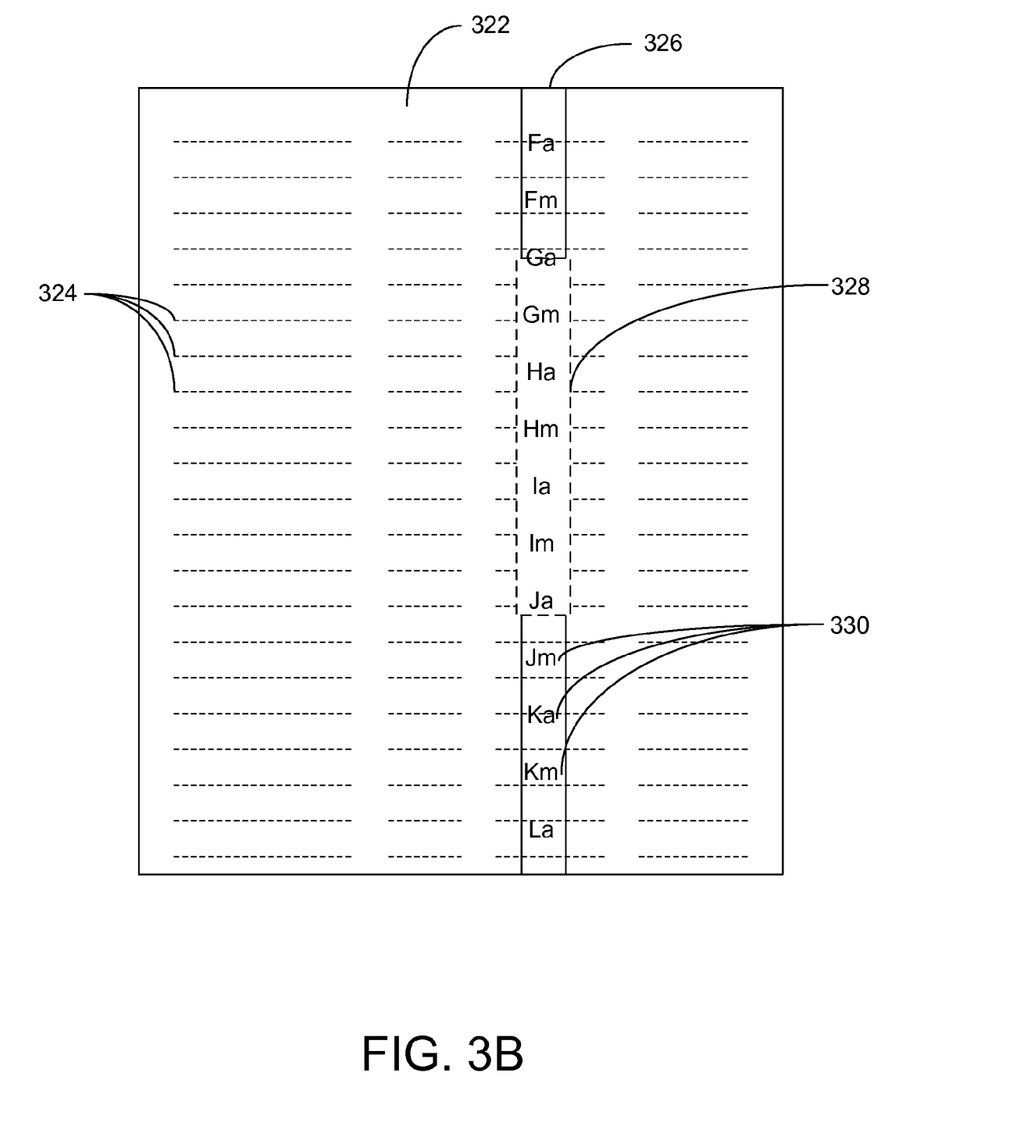
FIG. 3B depicts a display of a device which uses one embodiment of a scrolling system with adjustable granularity with a scroll bar in a second position.

FIG. 3B depicts a display of a device which uses one embodiment of a scrolling system with adjustable granularity with a scroll bar 326 in a second position. Similar to the device depicted in FIG. 3A, the device includes a display 322 whereupon data 324 is displayed in a viewing window. The display 322 displays a scroll bar 326 vertically oriented and positioned towards the center of the display 322 at a second position. The second position of the scroll bar 326 corresponds to a second granularity setting. The scroll bar 326 includes a scroll frame 328 and an array of scroll or index fields 330 to assist a user with navigation through the list of data 324. Like the device of FIG. 3A, the scroll bar 326 includes a data field of letters, but includes two fields of data in the scroll bar 326. Further, the scroll frame 328 is larger than previous embodiments to illustrate the closer relation of the scroll frame 328 with the displayed data and corresponding granularity setting of the application as well as accommodating additional scroll fields within the scroll frame 328. In some embodiments, the scroll frame 328 may omit scroll fields altogether, for example, where a list of data is not ordered or in other designs where scroll fields are not included or otherwise needed.

Figure 3C:
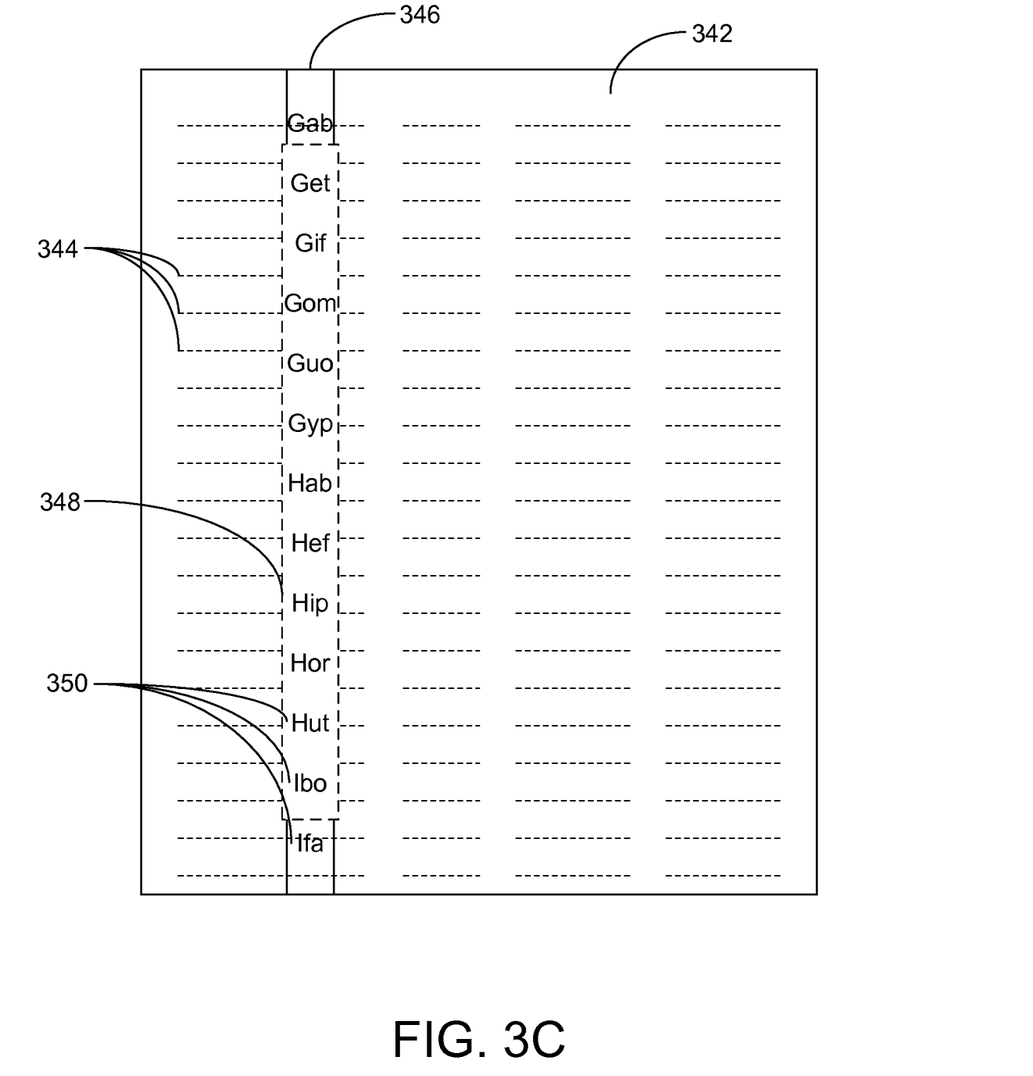
FIG. 3C depicts a display of a device which uses one embodiment of a scrolling system with adjustable granularity with a scroll bar in a third position.

FIG. 3C depicts a display of a device which uses one embodiment of a scrolling system with adjustable granularity with a scroll bar 346 in a third position. Similar to the devices depicted in FIGS. 3A and 3B, the depicted device includes a display 342 whereupon data 344 is displayed in a viewing window. The display 342 displays a scroll bar 346 vertically oriented and positioned on the left side of the display 342 at a third position. The third position of the scroll bar 346 corresponds to a third granularity setting. The scroll bar 346 includes a scroll frame 348 and an array of scroll or index fields 350 to assist a user with navigation through a list of data 344. In the illustrated embodiment, the scroll fields 350 include three fields of data in the scroll bar 346, being more specific scroll fields 350 than at previously described positions of the scroll bar 346. In some embodiments, the scroll fields 350 may include any number of fields of data in the scroll bar 326. The number of scroll fields 350 may also change with each granularity setting, or stay the same across the length of the display 342, notwithstanding changes in the granularity settings and sensitivity to scroll commands.

In the depicted embodiment, the scroll frame 348 extends almost the entire length of the display 342 corresponding to the underlying data on display and current granularity setting. In some embodiments, the scroll frame 348 may extend the entire length of the viewing window, where the scroll fields 350 approximately line up with the rows of data 344. In some displays 342, the viewing window will span only the length of a display area within a program window, while in other embodiments the viewing window may span the entire length of the display 342 of the device. Also, the scroll bar 346 and scroll frame 348 may span the length of a viewing window within the display 342 or alternatively across the entire display 342. In some embodiments, the scroll frame 348 remains the same size on the display 342 across each of the scroll bar positions and granularity settings, and need not necessarily change in physical size as the scroll bar 346 switches between granularity settings. In some embodiments, the scroll frame 348 may be omitted altogether, or be replaced with a scroll thumb for indicating a location relative to the list of data on the scroll bar 346.

Figure 4:
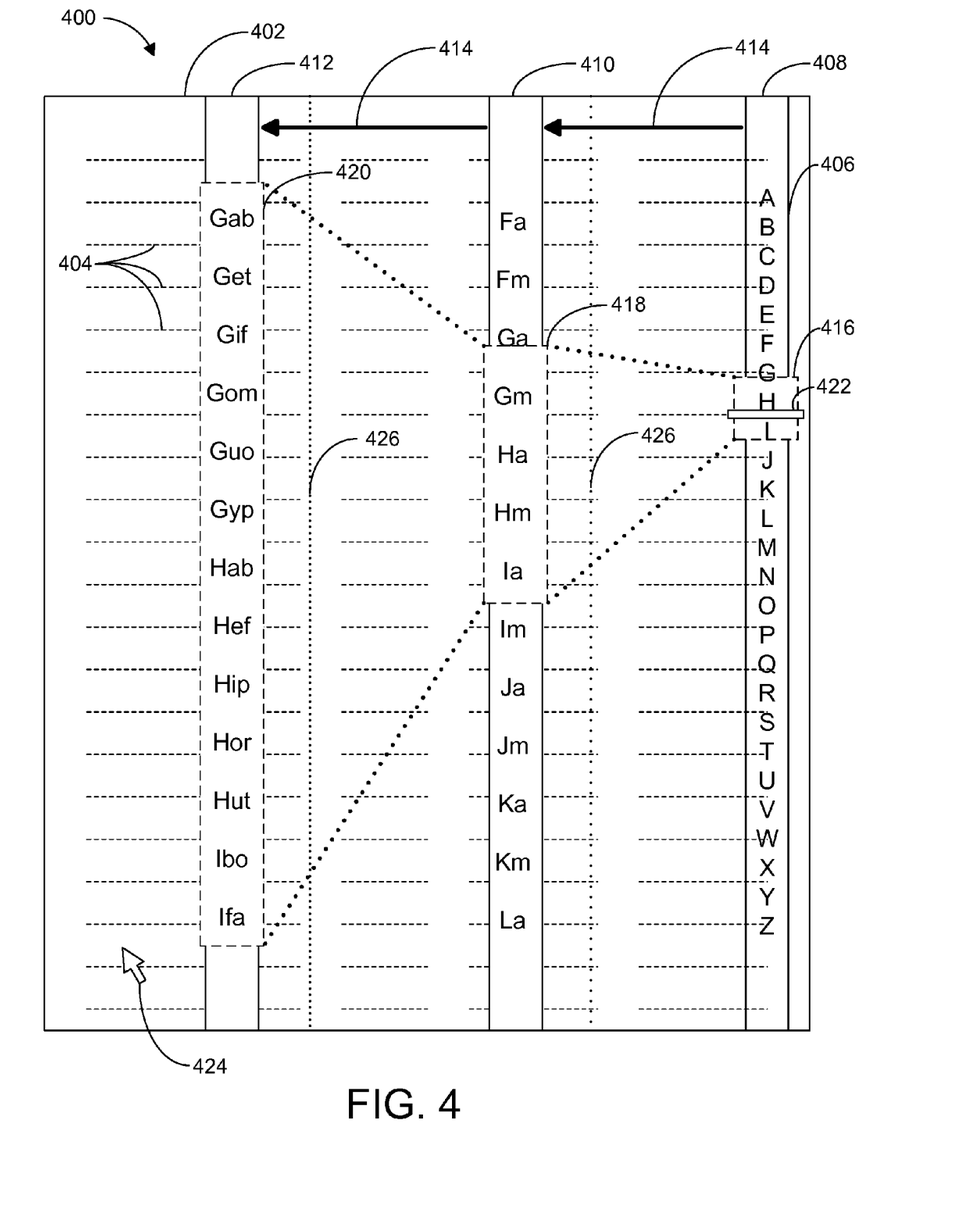
FIG. 4 depicts a display of a device which uses one embodiment of a scrolling system with adjustable granularity with three granularity settings.

FIG. 4 depicts a display of a device 400 which uses one embodiment of a scrolling system with adjustable granularity with three granularity settings. In the depicted embodiment, the device 400 includes a display 402 that displays a list of data 404. Moveable within the display 402 is a scroll bar 406 in a first position 408 on the right side of the display area. The scroll bar 406 includes a scroll frame 416 that may correspond with the viewing area of the display 402. The scroll bar 406 may also include a scroll thumb 422 that a user may utilize to issue a scroll command by clicking and sliding the scroll thumb 422 up and down the scroll bar 406. In some embodiments, the scroll frame 416 may perform the same function as the scroll thumb 422, and shift with a cursor 424 when an input command is given. The scroll frame 416 and scroll thumb 422 may also be separate components, where the scroll thumb 422 is part of the user interface, allowing a user to issue a scroll command, and the scroll frame 416 is a visual tool for navigating the list of data 404. In some embodiments, the scroll frame 416 may be omitted from the user interface altogether, where the scrolling is performed without the aid of a scroll frame 416 as illustrated in the figures.

The illustrated device 400 also depicts a plurality of scroll positions corresponding to different granularity settings. The first scroll bar 406 is in a first position 408 corresponding to a first granularity setting. The first setting is the least specific, and therefore most sensitive to a scroll command. When a granularity setting command is given, the scroll bar 406 moves 414 from a first scroll bar position 408 to a second position 410. When the scroll bar 406 moves 414 across a threshold line 426 from a first scroll bar position 408 to a second scroll bar position 410, the granularity setting changes from a first setting to a second setting. In the second position 410, the scroll bar 406 includes a scroll frame 418 that is larger than the first scroll frame 416 to compensate for the more specific scroll fields in the second scroll bar position 410. While the illustrated embodiment shows a first and second position 408, 410, the granularity setting may be the same for any scroll position within a particular region between threshold lines 426, and need not correspond to a specific scroll bar position within that particular region. A user may issue a granularity setting command to move the scroll bar 406 from the second position 410 to a third position 412. When the movement of the bar 406 moves 414 across a threshold line 426 to a third scroll bar position 412, the granularity setting also changes from a second setting to a third setting. The scroll bar 406 in the third position 412 may include a scroll frame 420 that is larger than the other two frames 416, 418, nearly extending the length of the display 402. This scroll frame may be arbitrary in size merely for illustrating a change in granularity setting or may correspond to a viewing area of displayed data. In other embodiments, the scroll frame 420 may remain unchanged between scroll positions and corresponding granularity settings. In the illustrated figure, the third scroll bar position 412 corresponds to the third most specific and least sensitive granularity setting, allowing a user to scroll through a list of data 404 slowly to pinpoint specific data fields. While the illustrated device 400 discloses three granularity settings, the scroll application may include any number of granularity settings and threshold lines 426 to make the transition 414 between different levels of granularity almost continuous from the viewpoint of a user with each granularity setting command.

One embodiment of the device 400 includes a cursor 424. The cursor 424 is a tool employed by many user interfaces that allows a user to select icons on a display 402 and issue commands. In the illustrated embodiment, the cursor 424 may be moved around the display 402 via a touch screen, mouse, joystick, or other input device. The cursor 424 may be a visible cursor, as shown in the illustrated embodiment, or may be a simple point of reference not visible to a user, indicated on the user interface by a point of contact, such as in many touch screen applications. The cursor 424 may be moved around the display 402 without interacting with components on the display 402. The cursor may also be used to select an icon on a display 402. In at least one embodiment, to issue a scroll command, the cursor 424 may be used to select the scroll thumb 422 and move the scroll thumb 422 up and down a vertical motion along the display 402. The scrolling application is configured to respond by moving the display area up, down, or in any direction to scroll through the list of data 404. To issue a granularity setting command, changing the scroll location and/or changing the granularity settings, a user may select a scroll bar 406 or scroll thumb 422 and slide the cursor 424 in a horizontal motion along the display 402. The scroll application is then configured to transition 414 between scroll positions and granularity settings when the scroll bar 406 is moved past a certain transition point 426.

In transitioning 414 between granularity settings, there may be some mixture between the scrolling direction and the direction of the granularity setting commend. In some embodiments, the application is configured to compensate or recognize simultaneous granularity setting and scroll inputs in a number of ways. While not all embodiments necessarily recognize simultaneous scroll and granularity setting commands, one way to recognize simultaneous scroll and granularity setting commands would be to separate each movement into a scroll component and a granularity setting component. If, for example, a cursor 424 selects a scroll thumb 422 and slides in a 45 degree angle between the scroll and granularity setting command directions, then the application would issue equally proportional scroll and granularity setting commands, moving the scroll bar 406 in the granularity setting command direction proportional to the same amount as the scroll thumb 422 in the scroll direction, depending on the granularity setting. In some instances, if there is a transition between a first and second granularity setting while a scroll command is still being given the application may be configured to scroll through the data 404 at a sensitivity corresponding to either the first or second granularity settings or may be configured to transition immediately upon crossing a transition point between granularity settings.

Another issue with the user interface may be inadvertent granularity setting and scroll commands, and the ability of the scrolling application to filter certain insignificant or inadvertent movements of the cursor 424 on the display 402. One way to compensate for inadvertent granularity setting and scroll commands is to have a minimum threshold of movement of a cursor 424 prior to issuing a granularity setting or scroll command. For example, if the cursor 424 moves less than 15 pixels in one direction, the application may be configured to ignore that movement and only recognize significant movements of the cursor 424 in a scroll or granularity setting command direction of greater than 15 pixels.

Other embodiments may require discrete granularity setting and scroll inputs such that each input can only be categorized as a granularity setting input or a scroll input. One way to compensate for simultaneous or inadvertent scroll and granularity setting commands is to recognize the first command given, and fail to recognize any other directional commands until the cursor 424 has deselected the icon or scroll thumb, indicating that the granularity setting or scroll command is done. For example, if a user wants to change the granularity setting and then scroll, they would select the scroll thumb 422 and slide the scroll bar 406 to the left. The user would then deselect the scroll thumb 422, indicating that the granularity setting command is done, and then issue a separate scroll command.

Another way to compensate for simultaneous or inadvertent scroll and granularity setting commands is to configure the scrolling application to detect a small period of inactivity, regardless of whether the scroll thumb 422 has been deselected or not. The application could do this by tracking clock cycles, making it possible to change from a granularity setting to a scroll command without deactivating the cursor 424. In this example, a user would issue a granularity setting command by sliding the scroll thumb in a first direction, wait for a small period of time (e.g. one second), and slide the scroll thumb 422 in a second direction, issuing a separate scroll command. This would allow a user to issue both scroll and granularity setting commands without deactivating and reactivating the cursor 424. A user could also indicate a change of command or beginning of a command by tapping a touchscreen or clicking a cursor to indicate the beginning of a scroll or granularity setting command. In some applications, the device 200 may be configured to sense movement of the device in general, and be programmed to recognize scroll or granularity setting commands upon sensing movement of the device 200.

Another way to compensate for simultaneous or inadvertent scroll and granularity setting commands is to configure the scrolling application to recognize the most significant command that is being given. In this embodiment, if a user were sliding the scroll thumb 422 at an angle between a first and second direction, the application would recognize only the most significant direction. For example, if a user issued a command at 30 degrees above horizontal, with a horizontal component of 100 pixels and a vertical component of 50 pixels, the scrolling application may be configured to recognize only the horizontal granularity setting command, and ignore the vertical scroll command, reducing confusion between conflicting or inadvertent commands. Another way to compensate for simultaneous or inadvertent scroll and granularity setting commands is to transition between a first and second command when the most significant direction changes. In cases where the transition between toggling and scrolling is not precise, the scrolling application may be configured to recognize the transition between commands without requiring the user to make a precise transition command to the user device 400.

Figure 5:
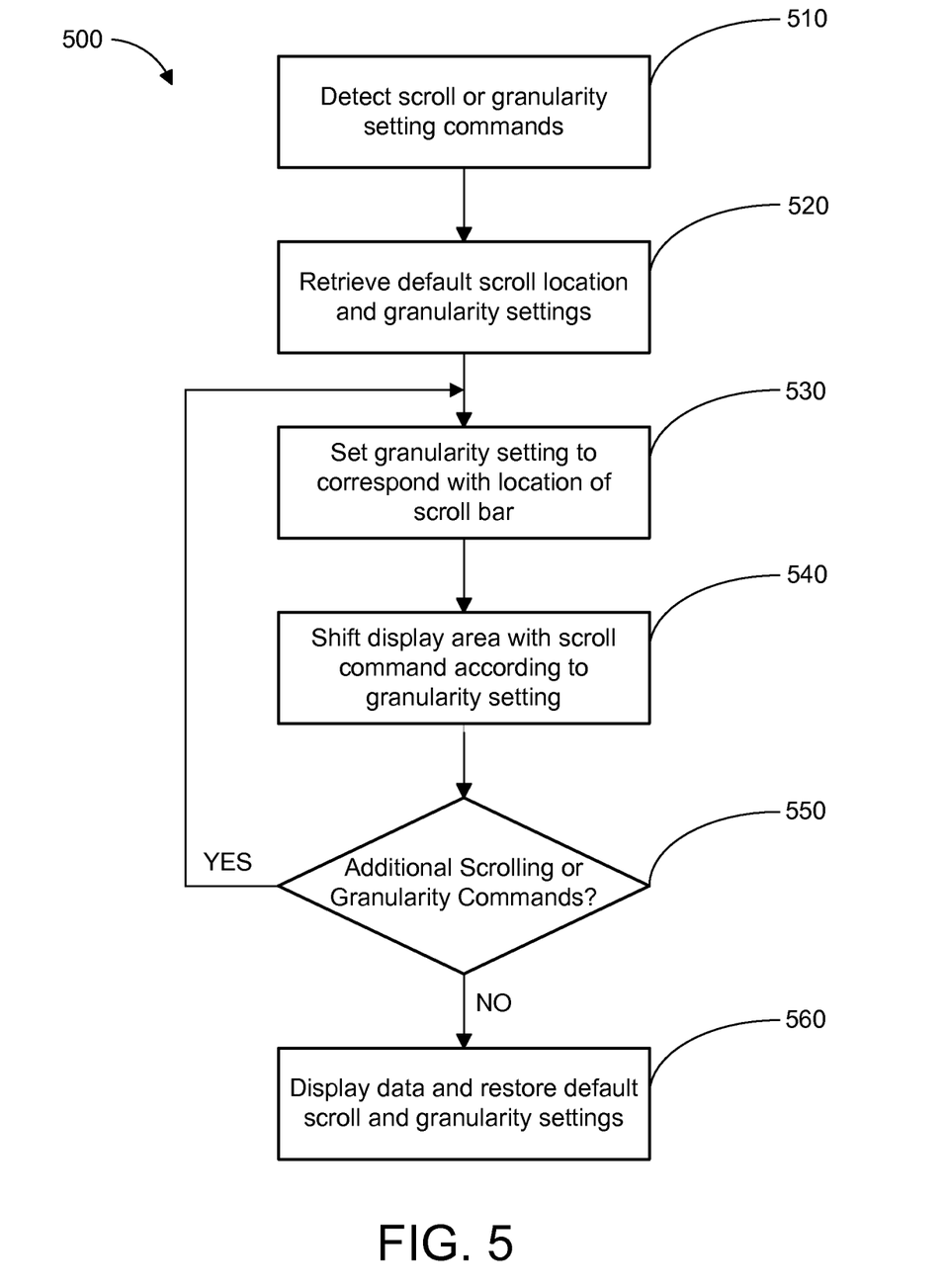
FIG. 5 discloses a flowchart of a method of one embodiment for scrolling with adjustable granularity.

FIG. 5 discloses a flowchart of a method 500 of one embodiment for scrolling with adjustable granularity. In the disclosed method 500, one particular process is discussed for a scrolling system with adjustable granularity, and may include other features and operations discussed in relation to other figures and embodiments.

The scrolling system detects 510 a scroll or granularity setting command. A scroll or granularity setting command is generally received from a user interface wherein a user moves a cursor or icon across a display screen. The scroll command is given when the cursor is moved in a first direction across the display and the granularity setting command is given when the cursor is moved in a second direction across the display screen. The directions may be perpendicular, as illustrated in the accompanying figures or may have a variety of orientations, depending on the user interface and method of indexing the data.

A processor retrieves 520 a default scroll location and granularity setting. These settings may be retrieved by the processor from a memory component within an electronic device. The application may be configured to always remain the same or may be dynamically updated to correspond to the scroll position and granularity settings.

The program sets 530 the granularity setting to correspond with the location of the scroll bar. This may be retrieved from the default settings or may be updated through the receipt of a granularity setting command. The granularity setting corresponds to the response sensitivity of scroll commands. The program shifts 540 the display area with the scroll command according to the current granularity setting. If the granularity setting is higher, then the scroll command is less sensitive and scrolling through data is done very precisely. If the granularity setting is lower, then the scroll command is more sensitive, and a user is able to scroll between large amounts of data at a very fast pace.

The scrolling application detects 550 additional scrolling or granularity setting commands. This may be through detection of movement by a cursor or movement of a scroll thumb vertically or horizontally across the display. If a command is being given, then the scrolling application is configured to receive those commands and repeat operations 530 and 540 of the method 500. If there are no additional scrolling or granularity setting commands, either through inactivity for a period of time or exiting the scrolling application, the scrolling application displays 560 the data and restores default scroll and granularity settings. This may be done by a memory component retrieving current scroll and granularity settings or instructing the current scroll and granularity settings to revert back to pre-programmed default settings until future scroll or granularity setting commands are given.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a scrolling system with adjustable granularity includes at least one processor or user device coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a cursor movement in a web page. The web page displays one or more content feeds. In one embodiment, operations to report the cursor movement in response to the cursor movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product, comprising:
a non-transitory computer readable storage medium to store a computer readable program, wherein the computer readable program, when executed by a processor within a computer, causes the computer to perform operations for a scrolling system with adjustable granularity, the operations comprising:
    detecting a scroll command in a first direction from a user interface, wherein a display area is configured to shift in the first direction in response to the scroll command;
    detecting a granularity setting command in a second direction from the user interface, the second direction being substantially perpendicular to the first direction, wherein a scroll bar is configured to move in the second direction in response to the granularity setting command, wherein the scroll bar comprises data to index scrollable content within the display area; and
    adjusting a granularity setting from a first granularity setting to a second granularity setting after the scroll bar moves from a first scroll bar position across a threshold point into a second scroll bar position, the first scroll bar position corresponding to the first granularity setting and the second scroll bar position corresponding to the second granularity setting, wherein the granularity setting corresponds to the sensitivity of response to a scroll command upon the scrollable content, wherein the first granularity setting comprises a first rate at which data in the display area shifts in response to the scroll command, and wherein the second granularity setting comprises a second rate at which data in the display area shifts in response to the scroll command.

2. The computer program product of claim 1, wherein the computer readable program, when executed on a computer, causes the computer to perform additional operations, comprising:
    receiving the scroll and granularity setting commands from a touchscreen interface, wherein the scroll and granularity setting commands are given by a user touching and sliding an object across the touchscreen interface.

3. The computer program product of claim 1, wherein the computer readable program, when executed on a computer, causes the computer to perform additional operations, comprising:
    receiving the scroll and granularity setting commands through use of a cursor input, wherein the scroll and granularity setting commands are given by activating and sliding the cursor input across the display.

4. The computer program product of claim 1, wherein the computer readable program, when executed on a computer, causes the computer to perform additional operations, comprising:
    storing a most recently used granularity setting and scroll bar position as a retrievable setting; and
    retrieving the retrievable setting upon detection of a new scroll or granularity setting command.

5. The computer program product of claim 1, wherein the computer readable program, when executed on a computer, causes the computer to perform additional operations, comprising:
    resetting the granularity setting and scroll bar position to a stored default setting; and
    retrieving the stored default setting upon detection of a new scroll or granularity setting command.

6. The computer program product of claim 1, wherein the computer readable program, when executed on a computer, causes the computer to perform additional operations, comprising:
    recognizing a command given in a direction between the first and second direction; and
    receiving a scroll command and a granularity setting command from the command given in a direction between the first and second direction.

7. The computer program product of claim 1, wherein the computer readable program, when executed on a computer, causes the computer to perform additional operations, comprising:
    receiving a command given in a direction between the first and second direction; and
    recognizing the command as a granularity setting command or a scroll command.

8. A method for scrolling with adjustable granularity, comprising:
    detecting a scroll command in a first direction from a user interface, wherein a display area is configured to shift in the first direction in response to the scroll command;
    detecting a granularity setting command in a second direction from the user interface, the second direction being substantially perpendicular to the first direction, wherein a scroll bar is configured to move in the second direction in response to the granularity setting command, wherein the scroll bar comprises data to index scrollable content within the display area; and
    adjusting a granularity setting from a first granularity setting to a second granularity setting after the scroll bar moves from a first scroll bar position across a threshold point into a second scroll bar position, the first scroll bar position corresponding to the first granularity setting and the second scroll bar position corresponding to the second granularity setting, wherein the granularity setting corresponds to the sensitivity of response to a scroll command upon the scrollable content, wherein the first granularity setting comprises a first rate at which data in the display area shifts in response to the scroll command, and wherein the second granularity setting comprises a second rate at which data in the display area shifts in response to the scroll command.

9. The method of claim 8, further comprising:
    receiving the scroll and granularity setting commands from a touchscreen interface, wherein the scroll and granularity setting commands are given by a user touching and sliding an object across the touchscreen interface.

10. The method of claim 8, further comprising:
    receiving the scroll and granularity setting commands through use of a cursor input, wherein the scroll and granularity setting commands are given by activating and sliding the cursor input across the display.

11. The method of claim 8, further comprising:
storing a most recently used granularity setting and scroll bar position as a retrievable setting; and
retrieving the retrievable setting upon detection of a new scroll or granularity setting command.

12. The method of claim 8, further comprising:
resetting the granularity setting and scroll bar position to a stored default setting; and
retrieving the stored default setting upon detection of a new scroll or granularity setting command.

13. The method of claim 8, further comprising:
recognizing a command given in a direction between the first and second direction; and
receiving a scroll command and a granularity setting command from the command given in a direction between the first and second direction.

14. The method of claim 8, further comprising:
receiving a command given in a direction between the first and second direction; and
recognizing the command as a granularity setting command or a scroll command.

15. A scrolling system with adjustable granularity, comprising:
a user interface that displays data on a display device; and
a system for scrolling through data configured to:
detect a scroll command in a first direction from a user interface, wherein a display area is configured to shift in the first direction in response to the scroll command;
detect a granularity setting command in a second direction from the user interface, the second direction being substantially perpendicular to the first direction, wherein a scroll bar is configured to move in the second direction in response to the granularity setting command, wherein the scroll bar comprises data to index scrollable content within the display area; and
adjust a granularity setting from a first granularity setting to a second granularity setting after the scroll bar moves from a first scroll bar position across a threshold point into a second scroll bar position, the first scroll bar position corresponding to the first granularity setting and the second scroll bar position corresponding to the second granularity setting, wherein the granularity setting corresponds to the sensitivity of response to a scroll command upon the scrollable content, wherein the first granularity setting comprises a first rate at which data in the display area shifts in response to the scroll command, and wherein the second granularity setting comprises a second rate at which data in the display area shifts in response to the scroll command.

16. The scrolling system of claim 15, wherein the system for scrolling through data is further configured to:
receive the scroll and granularity setting commands from a touchscreen interface, wherein the scroll and granularity setting commands are given by a user touching and sliding an object across the touchscreen interface.

17. The scrolling system of claim 15, wherein the system for scrolling through data is further configured to:
store a most recently used granularity setting and scroll bar position as a retrievable setting; and
retrieve the retrievable setting upon detection of a new scroll or granularity setting command.

18. The scrolling system of claim 15, wherein the system for scrolling through data is further configured to:
reset the granularity setting and scroll bar to a stored default setting; and
retrieve the stored default setting upon detection of a scroll or granularity setting command.

19. The scrolling system of claim 15, wherein the system for scrolling through data is further configured to:
recognize a command given in a direction between the first and second direction; and
receive a scroll command and a granularity setting command from the command given in a direction between the first and second direction.

20. The scrolling system of claim 15, wherein the system for scrolling through data is further configured to:
receive a command given in a direction between the first and second direction; and
recognize the command as a granularity setting command or a scroll command.

* * * * *